3,190,305
MIXTURE RATIO CONTROL VALVE
William A. Schulze, Huntsville, Ala., assignor to the United States of America as represented by the Secretary of the Army
Filed Dec. 29, 1961, Ser. No. 163,366
2 Claims. (Cl. 137—255)
(Granted under Title 35, U.S. Code (1952), sec. 266)

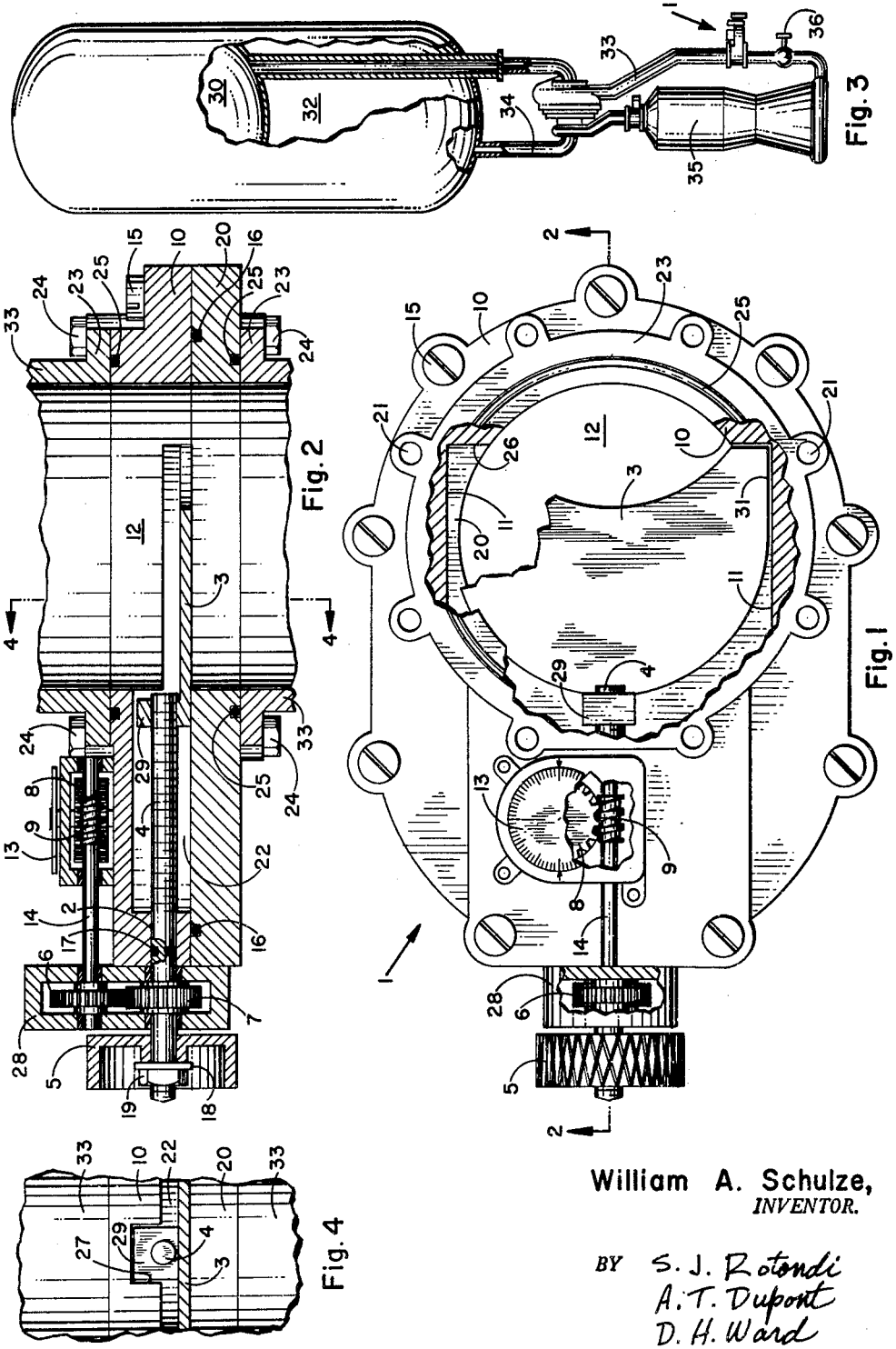

The invention described herein may be manufactured and used by or for the Government for governmental purposes without the payment of any royalty thereon.

This invention relates generally to control valves and more particularly to a control valve which regulates the ratio of fuel to oxidizer entering the thrust chamber of a liquid propellant rocket.

The use of missiles as long range artillery weapons requires accurate trajectory reproducibility of successive missiles. The total impulse and the take-off to cut-off weight ratio must be held within close limits if the missile trajectory is to be satisfactory. To obtain maximum performance and reliability along with satisfactory trajectories a missile must have a propellant utilization system which provides the proper consumption of fuel and oxidizer. To obtain the proper consumption of fuel and oxidizer ratio of the fuel and oxidizer must be controlled so that both propellant containers empty simultaneously resulting in a longer missile burning time. Considerable difficulty has been experienced in obtaining a maximum burning time due to lack of control over the mixture ratio of the fuel and oxidizer. This lack of control has resulted in shorter burning time because while one propellant may run out, a large amount of the other propellant may remain in its container. For example, inaccuracies in filling the containers, density variations of the alcohol and liquid oxygen with temperature and ambient pressure and manufacturing tolerances would all cause deviations in the mixture ratio resulting in variations of relative amounts of propellants remaining in the containers after cut-off. Variations in temperature and altitude cause considerable shifts in mixture ratio which also results in shorter burning time. During missile flight, the mixture ratio changes due to turbine speed reduction, container level changes and container pressure changes.

One object of this invention is to provide a device to regulate the mixture ratio of fuel to liquid oxygen entering the thrust chamber of a liquid propellant rocket.

It is another object of this invention to incorporate an adjustable orifice in the engine of a liquid propellant rocket to control the mixture ratio of fuel to oxidizer and provide an efficient propellant utilization system.

It is a further object of this invention to incorporate an adjustable orifice in the alcohol feeding line of a liquid propellant rocket to provide a substantial increase in the burning time of the missile.

A further object of the invention is to provide a device whereby the mixture ratio spread from one rocket engine to another during acceptance testing can be eliminated.

An additional object of the invention is to provide a device which will reduce the number of acceptance tests by applying remote control adjustments during calibration or hot firings.

A further object of this invention consists of providing a device for extending the holding time of a fueled missile.

It is still another object of the present invention to incorporate an adjustable orifice in the fuel feeding line of a liquid propellant rocket resulting in more accurate trajectory reproducibility because of less variation in cut-off weights.

According to the present invention, the foregoing and other objects are attained by providing a manually or remotely adjustable gate-type, flow differential control valve for regulating the mixture ratio of the fuel and liquid oxygen entering the thrust chamber of a liquid propellant rocket.

The invention will be more fully understood through the following detailed description taken in conjunction with the accompanying drawing wherein:

FIGURE 1 is a plan view, partly in section, of the control valve showing the gate in the fully closed position.

FIGURE 2 is an elevational view taken along lines 2—2 of FIGURE 1.

FIGURE 3 is an assembly view of the propulsion system.

FIGURE 4 is an elevational view taken along lines 4—4 of FIGURE 2.

Referring to FIGURE 1 the mixture ratio control valve is shown having a housing formed by an upper plate 10 and a lower plate 20 and having a cylindrical chamber 12 for containing an adjustable valve gate 3. The inner diameters of the plates forming chamber 12 are the same except for a portion of plate 10 which has a recess 11. This recess extends for approximately two thirds of the thickness and diameter of plate 10 and ends in an abutment 26. Valve gate 3 is a disk-like member designed to seat on the upper and inner surface of plate 20 so that the straight outside portion 31 of the valve gate slidably engages recess 11 of plate 10. The lateral movement of gate 3 is limited by abutment 26 of plate 10 so that in its fully extended position as shown, gate 3 closes off approximately two thirds of chamber 12. Valve gate 3 has a boss 29 threadably attached to shaft 4 which extends through upper plate 10 and has a knob 5 fastened to its end. By turning the knob the shaft may be rotated to effect lateral movement of gate 3 as will be discussed more fully hereinafter. The position of gate 3 is determined by a dial indicator 13 attached to the upper surface of a gear 8. Gear 8 meshes with worm gear 9 carried by shaft 14 which in turn is mechanically linked through gear 6 to shaft 4.

Referring to FIGURE 2 a pair of interconnecting chambers 12 and 22 are contained between plates 10 and 20 which form the valve housing. The housing plates are rigidly secured through a plurality of bolts 15 spaced around the outer periphery of these plates. An annular groove in housing plate 20 contains an O-ring 16 for preventing leakage of fluid from chambers 12 and 22. A fuel line 33 having an annular flange 23 is connected to upper plate 1 by a plurality of screws 24. In a similar manner the fuel line is connected to lower plate 20 by screws 24 extending through openings 21 (FIGURE 1) in flange 23. An annular groove on the lower surface of housing plate 20 contains an O-ring 25 for preventing fluid leakage between the fuel line and plates 10 and 20 of the valve housing. An annular opening 2 at one end of upper plate 1 constitutes a bearing for shaft 4 which extends therethrough. Within opening 2 the shaft has an annular groove which contains an O-ring 17 to prevent fluid leakage from chamber 22. A gear housing 28, which is attached to the end of the valve housing by any suitable means, contains a pair of meshing gears 6 and 7 keyed to shafts 14 and 4 respectively to prevent lateral movement of these shafts. Shaft 4, which has knob 5 secured at one end by washer 18 and nut 19, extends through housing 28, opening 2 and terminates in chamber 22. The portion of shaft 4 which is located within chamber 22 is threaded for engagement with boss 29 at the end of valve gate 3. By turning knob 5 in a clockwise direction the rotation of shaft 4 will draw valve gate 3 into chamber 22. Chamber 22 is of sufficient length to permit complete withdrawal of gate 3 from chamber 12 allowing free fuel flow through the latter chamber if so desired.

Referring to FIGURE 3 the mixture ratio control valve 1 is shown in relation to the propulsion system. The propulsion system includes a fuel tank 30, an oxidizer tank 32 and feed lines 33 and 34 for connecting the tanks to thrust chamber 35. Feed line 33 has a main fuel valve 36 as well as mixture ratio control valve 1.

Referring to FIGURE 4 the relationship of valve gate 3 and integral boss 29 with respect to plates 10 and 20 is more clearly shown. The valve gate seats on the upper surface of plate 20 and boss 29 is guided through upper plate 10 by channel 27 formed therein.

Obviously, numerous modifications and variations of the present invention are possible in the light of the above teachings. It is, therefore, to be understood that within the scope of the appended claims the invention may be practiced otherwise than as specifically described herein.

I claim:

1. In a fluid system, a first source of fluid, a second source of fluid, a container for said fluids, feed lines connecting said sources with said container, the improvement residing in a valve disposed in said line connecting said first source to said container for controlling flow of said first fluid to said container for maintaining a predetermined ratio of said fluids in said container, said valve including a housing provided with upper and lower plates having inlet and outlet ports respectively disposed therein in alignment and an interior chamber intermediate said ports, a gate disposed in said chamber for reciprocating movement between a first position and a second position wherein said gate in its first position provides a fully open passageway from said inlet to said outlet and when in said second position provides a partially open passageway between said inlet and outlet, and said gate provided with an inwardly curved surface, means for moving said gate in a reciprocating movement including a boss secured to one end of said gate, a shaft secured in said housing and having one end in threaded engagement with said boss, said shaft disposed for rotation in said boss for movement of said gate, means for guiding said gate in the reciprocating movement and for limiting movement of said gate, said means including a recess formed in said upper plate and having a pair of substantially parallel surfaces extending about two thirds of the diameter of said inlet port and a pair of seating surfaces disposed in normal relation to said parallel surfaces to provide a seat for said gate, said means for guiding and limiting movement of said gate coacting with said gate so that when said gate is in said second position said inwardly curved surface cooperates with a wall of the chamber to cover only a major portion of said interior chamber to provide the partially open passageway.

2. A valve as set forth in claim 1 wherein said gate is a partially annular disk-like member having a pair of sides disposed in parallel relation for movement in said parallel surfaces of said upper plate, a portion of said gate having a pair of seating surfaces formed in normal relation to said side parallel surfaces for seating engagement with said seating surfaces of said upper plate, said inwardly curved surface disposed on said disk-like plate between said seating surfaces to provide a substantially oval opening intermediate said ports when said gate is in said second position.

References Cited by the Examiner

UNITED STATES PATENTS

| | | | |
|---|---|---|---|
| 260,936 | 7/82 | Callahan | 251—328 |
| 458,762 | 9/91 | Charonnat | 137—553 |
| 1,458,373 | 6/23 | Willman | 251—326 |
| 1,751,122 | 3/30 | Barker | 251—328 |
| 2,213,582 | 9/40 | Hall | 138—46 |
| 2,217,643 | 10/40 | Rude | 138—46 |
| 2,609,837 | 9/52 | Enander | 138—46 |
| 2,687,168 | 8/54 | Haviland | 60—35.6 |
| 2,743,577 | 5/56 | Malick | 60—35.6 |
| 2,816,419 | 12/57 | Mueller | 60—35.6 |
| 2,967,393 | 1/61 | Von Braun | 60—35.6 |
| 3,002,529 | 10/61 | Bowman | 137—553 |

SAMUEL LEVINE, *Primary Examiner.*

ABRAM BLUM, MARK NEWMAN, *Examiners.*